Aug. 26, 1958     W. W. TAYLOR     2,849,187
LIQUID FLOW CONTROL
Filed June 14, 1954
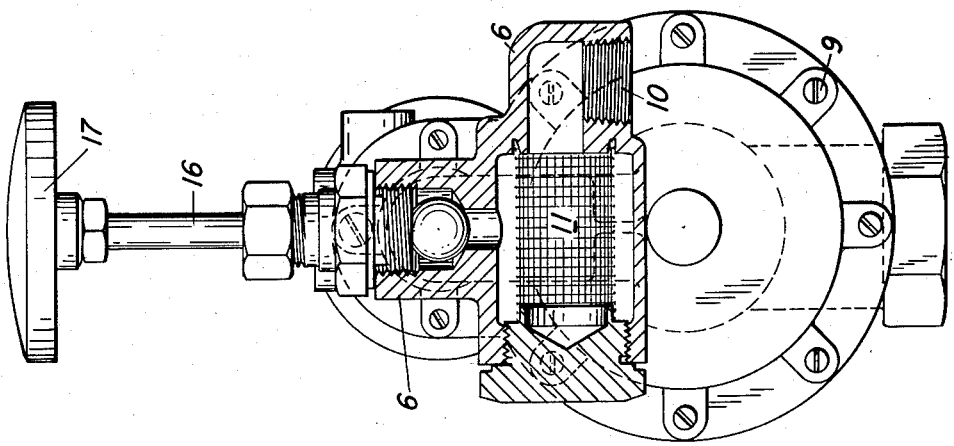
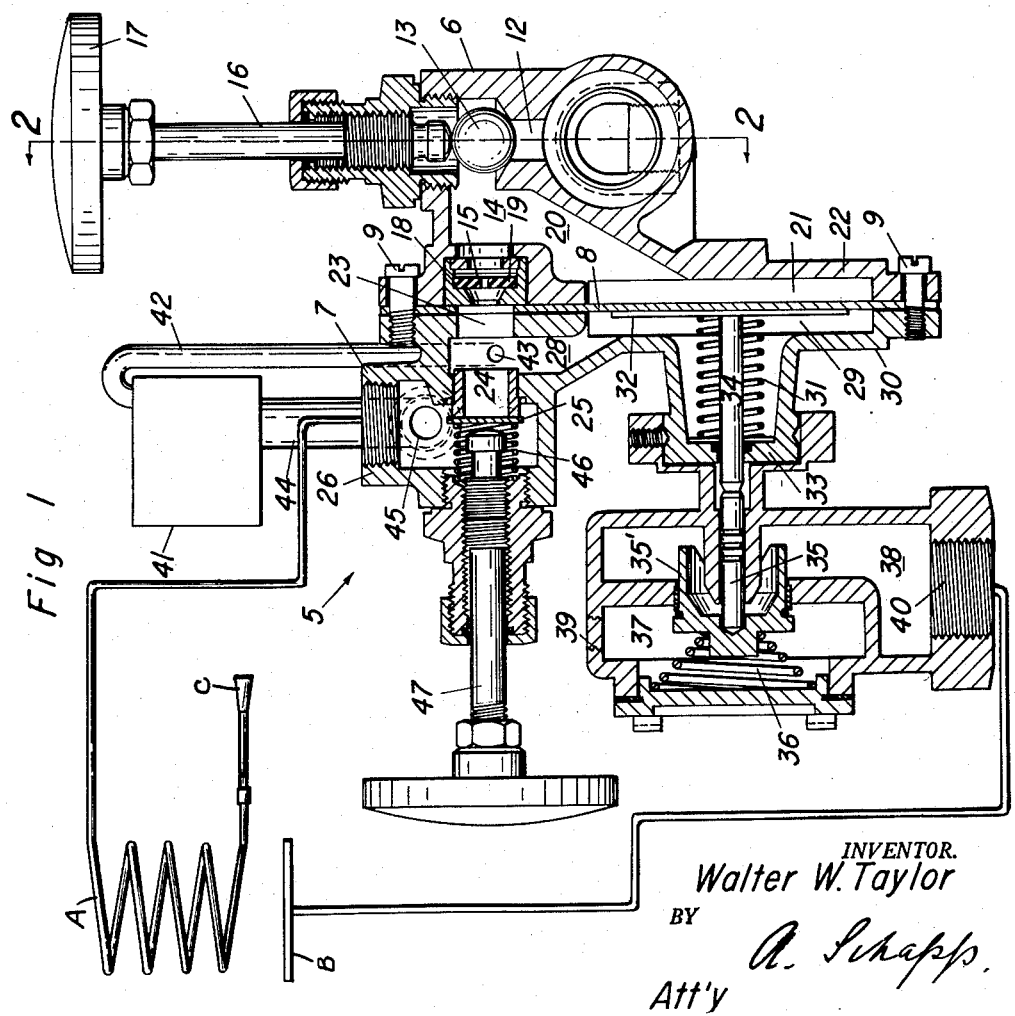
INVENTOR.
Walter W. Taylor
BY
*A. Schapp.*
Att'y

United States Patent Office 2,849,187
Patented Aug. 26, 1958

2,849,187

LIQUID FLOW CONTROL

Walter W. Taylor, Oakland, Calif., assignor to Malsbary Manufacturing Company, Oakland, Calif., a corporation of California Application June 14, 1954, Serial No. 436,547

3 Claims. (Cl. 236—25)

The present invention relates to improvements in a liquid flow control, and contemplates certain advances in the differential pressure-responsive control described in Patent No. 2,618,287, issued November 18, 1952.

My invention is particularly intended for use in connection with a cleaning machine for cleaning motor vehicles and heavy industrial machinery, in which water is passed under pressure through a coil and a hose for discharge through a nozzle attached to the end of the hose, means being provided for adding a cleaning solution to the water before it passes through the coil, and further means being provided, in the form of a gas or oil burner for heating the liquid while it passes through the coil.

Where a machine of this type is connected to the city water supply or a similar source of water under pressure, the volume of flow normally depends upon the pressure at the source, and the volume changes as the pressure changes. Since the pressure at the source is subject to frequent changes, such as might be occasioned by the opening and closing of different valves in the system, the normal flow of water also changes, which tends to render the performance of the machine imperfect. Still, the use of the city water supply in a machine of this character is very advantageous, since it obviates the installation of expensive special pumping equipment and the cost of operating the latter.

In the present invention, it is proposed to provide a liquid flow control which causes a constant flow of water through the machine, at a constant volume, regardless of changes in pressure at the source of supply.

It is further proposed to utilize the constant flow of water to feed a constant flow of solution into the water before it reaches the coil. This is particularly desirable, because the presence of the solution in the water while it passes through the coil has a certain cleaning effect on the latter.

Further objects and advantages of my invention will appear as the specification proceeds, and the new and useful features of my liquid flow control will be fully defined in the claims attached hereto.

The preferred form of my invention is illustrated in the accompanying drawing, forming part of this application, in which:

Figure 1 shows a vertical longitudinal section through my flow control; and

Figure 2, a transverse section taken along line 2—2 of Figure 1.

While I have shown only the preferred form of my invention, it should be understood that various changes or modifications may be made within the scope of the claims attached hereto, without departing from the spirit of the invention.

Referring to the drawing in detail, my flow control comprises in its principal features, a housing 5 divided generally into two sections 6 and 7, respectively, by means of a diaphragm 8, the two sections being bolted upon opposite sides of the diaphragm, along the rim thereof, as shown at 9.

The first section 6 is formed with an intake 10, which may be connected to any source of water under pressure, such as a city water supply, a filtering chamber indicated at 11, a vertical port 12 controlled by a ball valve 13, and a horizontal port 14 leading to a valve 15.

The ball valve 13 is controlled by the threaded valve stem 16 operable by the handle 17.

The valve 15 is substantially similar to that disclosed in Patent No. 2,389,134, known in the market as the Dole valve, and comprises a flat valve seat 18 having a rubber washer 19 mounted thereon, the washer having an inner section extending inwardly over the opening of the valve seat. As liquid under pressure is forced through the opening in the washer, it tends to deform the washer and to reduce the hole in the washer as the pressure increases.

The general theory of the washer is that the two factors of increase in pressure and reduction in the size of the washer opening compensate one another and cooperate in maintaining the volume of flow substantially constant, regardless of changes in pressure, provided that a minimum differential in pressure is maintained, say approximately ten pounds. This valve will be referred to as a flexible washer.

Thus, when the pressure at the source is seventy pounds, the flow through the valve will remain constant, as long as the pressure differential is maintained, that is, as long as the pressure on the delivery side does not exceed sixty pounds. The same flow is maintained when the pressure at the source drops to fifty pounds, as long as the pressure on the delivery side does not exceed forty pounds.

In my invention, therefore, in order to insure a constant flow of water, it is proposed to maintain the necessary pressure differential, that is, to prevent the pressure on the delivery side from rising above sixty pounds, when the pressure at the source is seventy pounds; or above forty pounds, when the pressure at the source drops to fifty pounds.

On the other hand, it is desirable, in my invention, to maintain the pressure on the delivery side of the valve as high as possible to insure sufficient pressure at the nozzle, that is, in the examples selected, to maintain the pressure at the delivery side of the valve at sixty pounds when the pressure at the source is seventy pounds; and at forty pounds when the pressure at the source drops to fifty pounds. The remaining structure is principally designed to accomplish this object.

The port 14 communicates, through passage 20, with a chamber 21 formed between the housing wall 22 and the major portion of the diaphragm 8, so that full force of the pressure at the source is made to bear on the near face of the diaphragm.

The valve 15 discharges into a port 23 formed in the second housing section opposite the valve, and the water, in its general flow, passes through a nipple 24, a resistance valve 25 and the outlet 26, which connects with the coil of the cleaning machine, shown at A. The coil discharges through a nozzle C.

But the water also spreads, through passage 28, into a chamber 29 formed between the housing wall 30 and the far side of the diaphragm 8, so that the pressure prevailing in the delivery side of the valve 15 is brought to bear on the far side of the diaphragm.

The far side of the diaphragm is also acted on by a spring 31, which bears on a disc 32 arranged adjacent the diaphragm and on a projecting portion 33 of the housing. The disc has a piston 34 projecting therefrom, which is mounted centrally of the spring and is slidable in the projecting portion 33 of the housing.

The piston 34 acts on a plunger 35, which again operates a valve 35' controlling the gas supply to the burner used for heating the coil. This valve may be of conventional form, is normally seated by a spring 36 and may be opened by the plunger 35 to establish communication between the gas intake chamber 37 and gas outlet chamber 38.

The gas intake chamber is connected to any suitable source of gas through inlet 39, and the outlet chamber 38 connects with the burner through outlet 40 the burner being shown at B.

The steady flow of water through my flow control is also utilized to insure a correspondingly steady flow of cleaning solution into the water. This is done by by-passing a small stream of water to actuate a similar stream of solution to enter the general flow.

A solution tank is shown at 41. The by-pass comprises an outlet pipe 42 connected to passage 28, as at 43 and connected to the upper end of the tank, and a return pipe 44 connected to the general conduit downstream of the valve 25, as at 45. The valve 25 is acted on by a spring 46 to exert a limited resistance to the general flow through the main conduit, so as to cause a minor stream of water to pass through pipe 42 into the upper end of the tank 41.

If the tank 41 contains the desired mixture, or solution, the incoming water will displace an equal amount of solution and cause the latter to pass through pipe 44 to join the main flow. Since, in ordinary operation of the machine, only a trickle, drop-wise feed of solution is required, the spring 46 is selected with a view of exerting only very light pressure, say, about one-quarter of a pound.

Valve 25 may be closed positively by operation of the valve stem 47, if no main flow of water feed is desired. This feature is useful when it is desired to clean the coil. In this case, pure solution, which may be a suitable acid, is forced through the coil to remove scale and other impurities.

In operation, if my flow control is connected to a city water supply which has a pressure of seventy pounds, it is desired to maintain the pressure at the delivery side of the valve at sixty pounds. The pressure on the delivery side is determined by the orifice in the nozzle and the heat applied to the coil, which causes the water to expand and to turn partly into vapor.

At first, with the water cold, it may be assumed that there is little pressure on the delivery side. With seventy pounds bearing on the near face of the diaphragm, and practically no pressure on the other side, the diaphragm will actuate the piston 34 to open the valve 35' to insure a free flow of gas to the burner underneath the coil.

As the water in the coil is heated, the pressure on the delivery side of the valve 15 increases and will keep increasing until the combined pressure of the water and the spring 31 equals the pressure on the near side of the diaphragm.

This will happen at sixty pounds, since the spring pressure is equivalent to ten pounds, and at this time the gas valve closes. As soon as the pressure drops, the gas valve reopens and a constant pressure of sixty pounds is maintained, with a constant pressure differential of ten pounds. The pressure differential may, of course, be controlled by proper selection of spring 31.

If, through the opening of any other valve or faucet in the supply system, the pressure at the source should drop to fifty pounds, the pressure on the far side of the diaphragm would momentarily exceed that on the near side, with the result that the gas valve would close completely and would allow the water in the coil to cool so as to reduce the pressure on the far side to forty pounds, whereupon the same pressure differential would be maintained.

In case there is a sudden drop in pressure in the supply system, and the pressure on the far side of the diaphragm momentarily exceeds that on the near side, the ball valve 13 serves as a check valve to prevent any back flow into the supply system.

Thus, my invention combines a uniform flow of water due to the pressure differential with maximum pressure at the nozzle under any given set of conditions.

The by-pass, at the same time, insures an equally uniform flow of solution into the main flow.

I claim:

1. In a liquid flow control, a conduit, means for passing a liquid therethrough under pressure, a pressure-responsive flexible washer, fixedly mounted, in said conduit and operable to pass a constant volume of liquid therethrough regardless of changes in pressure as long as a given minimum differential in pressure is maintained on opposite sides of the washer, and means operative on the delivery side of the washer for automatically maintaining a maximum delivery pressure consistent with the minimum pressure differential requirement.

2. In a liquid flow control, a conduit, means for passing a liquid therethrough under pressure, a pressure-responsive flexible washer, fixedly mounted, in said conduit and operable to pass a constant volume of liquid therethrough regardless of changes in pressure as long as a given minimum differential in pressure is maintained on opposite sides of the washer, a diaphragm subject to the washer intake pressure on one side thereof and subject to the washer delivery pressure on the opposite side thereof, means operable by the diaphragm tending to build up the delivery pressure toward a balancing of the pressures on opposite sides of the washer, and biasing means operative on the diaphragm to maintain said minimum pressure differential.

3. In a liquid flow control, a conduit, means for passing a liquid therethrough under pressure, a pressure-responsive flexible washer, fixedly mounted, in said conduit and operable to pass a constant volume of liquid therethrough regardless of changes in pressure as long as given minimum differential in pressure is maintained on opposite sides of the washer, a diaphragm subject to the washer intake pressure on one side thereof and subject to the delivery pressure on the other side thereof, heating means active on the liquid on the delivery side of the washer and controlled by the diaphragm for increasing the pressure on the delivery side when the latter drops below the point determined by the minimum pressure differential, and biasing means operative on the diaphragm to prevent the pressure on the delivery side from rising above said point.

References Cited in the file of this patent

UNITED STATES PATENTS

| | | |
|---|---|---|
| 811,749 | Somers | Feb. 6, 1906 |
| 2,044,557 | Alvord | June 16, 1936 |
| 2,389,134 | Brown | Nov. 20, 1945 |

FOREIGN PATENTS

| | | |
|---|---|---|
| 145,080 | Austria | Mar. 25, 1936 |
| 159,792 | Switzerland | Apr. 1, 1933 |